No. 768,358. PATENTED AUG. 23, 1904.
T. G. DAVIS.
HARROW.
APPLICATION FILED JAN. 18, 1904.
NO MODEL. 2 SHEETS—SHEET 2.
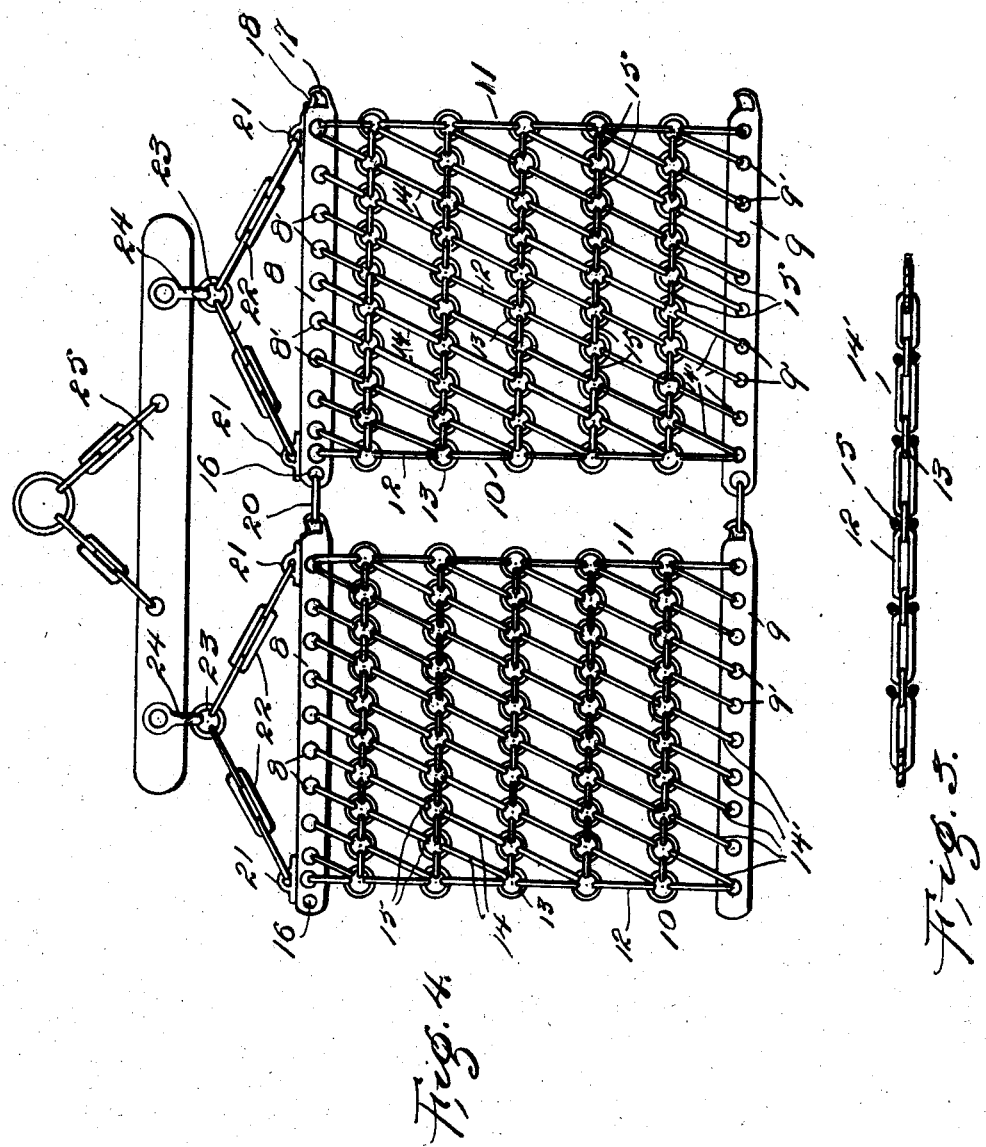

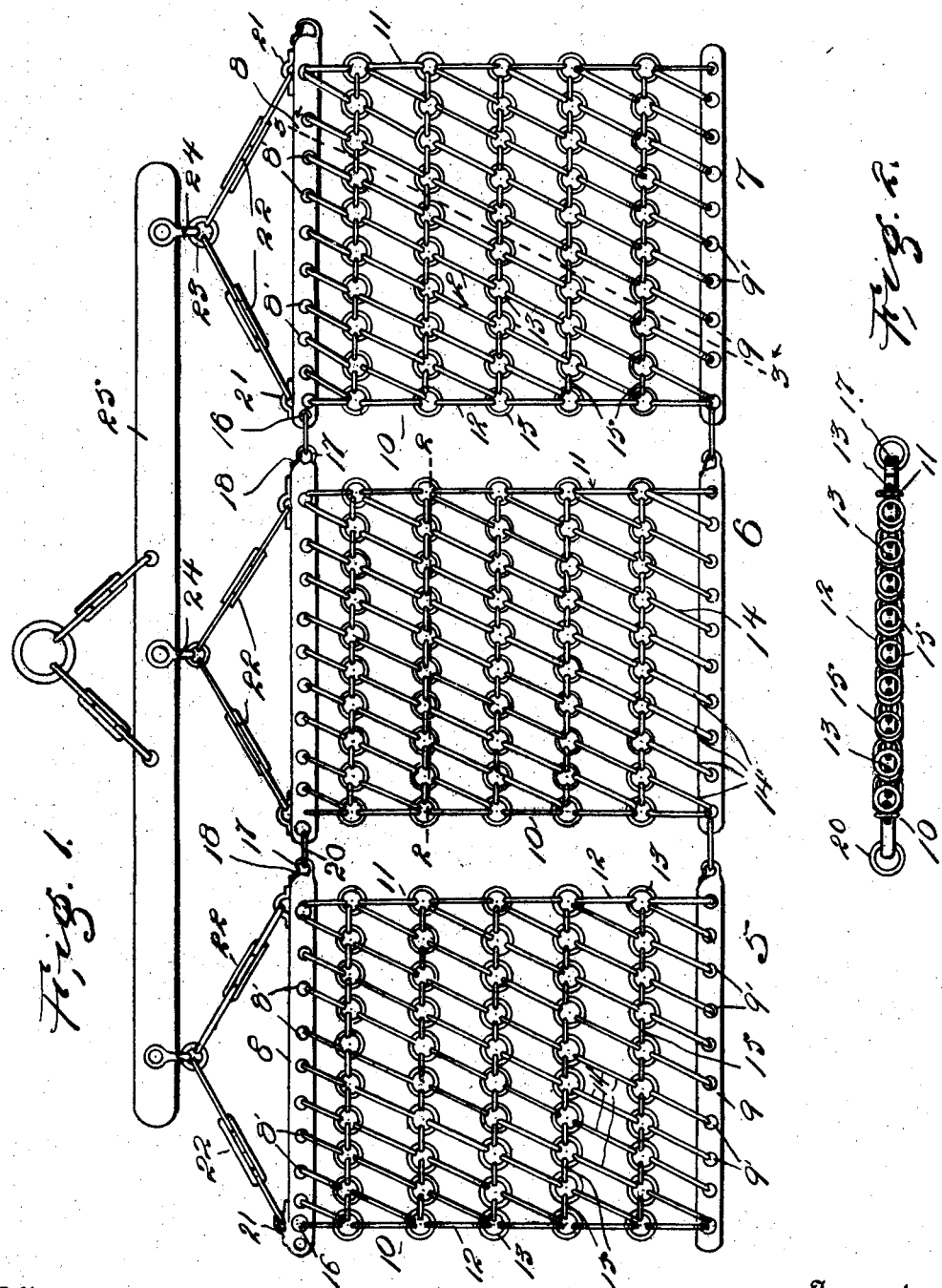

No. 768,358. Patented August 23, 1904.

UNITED STATES PATENT OFFICE.

THOMAS G. DAVIS, OF DESOTO, ILLINOIS.

HARROW.

SPECIFICATION forming part of Letters Patent No. 768,358, dated August 23, 1904.

Application filed January 18, 1904. Serial No. 189,547. (No model.)

*To all whom it may concern:*

Be it known that I, THOMAS G. DAVIS, a citizen of the United States, residing at Desoto, in the county of Jackson, State of Illinois, have invented certain new and useful Improvements in Harrows; and I do hereby declare the following to be a full, clear, and exact description of the invention, such as will enable others skilled in the art to which it appertains to make and use the same.

This invention relates to harrows, and more particularly to that class known as "flexible" harrows, and has for its object to provide an implement of this class composed of series of rings which will pulvervize the earth after it has been plowed and which will impart motion to the clods to insure their thorough pulverization.

A further object of the invention is to provide an arrangement whereby a harrow made in two or more sections may be folded to occupy a minimum amount of space when not in use.

In the drawings forming a portion of this specification, and in which like numerals of reference indicate similar parts in the several views, Figure 1 is a top plan view of the present harrow, showing the use of three sections. Fig. 2 is a section on line 2 2 of Fig. 1. Fig. 3 is a section on line 3 3 of Fig. 1, and Fig. 4 is a top plan view of a harrow embodying two sections.

Referring now to the drawings, there is shown in Fig. 1 a harrow comprising three sections 5, 6, and 7, which in general construction are identical. Each comprises two end plates 8 and 9, which are provided with series of perforations 8' and 9'. Connecting the end perforations of the series 8' with those of the series 9' are a pair of chains 10 and 11, each comprising vertical links 12 and horizontal links 13. A series of chains 14, also comprising vertical and horizontal links 12 and 13, respectively, are provided, a portion of which have their end links engaged with the perforations 8', while the remaining portion have their end links engaged with the perforations 9'. These chains are drawn at an angle to the end plates and are fastened at their remaining ends to the links 13 of the chains 10 and 11, those attached to the plate 8 being connected to the chain 10 and those connected to the plate 9 with the chains 11. This arrangement, as will be seen from the drawings, results in a diagonal arrangement of the chains 14, in which each chain is attached at one end to one of the end plates and at its remaining end to one of the side chains, with the exception of the central chains 14', which are attached at one end to an end of the plate 8 and at the remaining end to the opppsite end of the plate 9. The horizontal links 13 of the several chains are joined together by links 15, as shown.

In providing a harrow of several sections each section is of the construction just described, and the sections are attached one to another by means of fastenings described below.

Each of the plates 8 and 9 is provided at one end with perforations 16 and at the other with hooks 17, having latches 18. The perforations 16 carry rings 20, which are engaged with the hooks 17. It will thus be seen that a harrow may be composed of as many sections as desired, it being but necessary to attach additional sections. Each of the plates 8 is provided upon its forward edge with loops 21, with which are engaged chains 22, which have their central rings 23, engaged with the hooks 24 of a draft-bar 25, to which the horses are attached. It will be seen that as this implement passes over the ground the loose clods of earth will be given a diagonally-sidewise motion, coming into contact in their passage with the vertical links 12 of the different chains and with the connecting-links 15, and as the distance between the sections of the harrow is but a few inches the clods in their diagonal movement are transferred from one section to another, thus insuring thorough pulverization of the earth and breaking up of the large pieces.

In practice modifications of the specific construction shown may be made, and any suitable material and proportions may be used without departing from the spirit of the invention.

What is claimed is—

1. A harrow comprising end plates, chains connecting the ends of the plates and other chains connected to the plates at one end and the remaining ends to the first-mentioned chains and lying at an angle to the plates and chains.

2. A harrow comprising a plurality of sections, each section comprising end plates, chains connecting the plates at their ends, other chains attached at one end to the plates and at the remaining ends to the first-mentioned chains and lying at an angle to the plates and chains, and means for closely securing the several sections together.

3. A harrow comprising a plurality of sections each comprising perforated end plates, chains connecting the end perforations of the plates, other chains engaged at one end with the remaining perforations of the plates and at the other end with the first-mentioned chains, links attached to one end of each plate, and hooks attached to the remaining end of each plate and adapted for engagement with the links to hold the several sections in close relation.

In testimony whereof I affix my signature in presence of two witnesses.

THOMAS G. DAVIS.

Witnesses:
   JAS. A. HELM,
   THOS. J. REDD.